(12) United States Patent
Eyhorn

(10) Patent No.: US 6,589,488 B1
(45) Date of Patent: Jul. 8, 2003

(54) MOLDING FOR SUPPORTING A MONOLITH IN A CATALYTIC CONVERTER

(75) Inventor: Thomas Eyhorn, Altusried (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/439,558

(22) Filed: Nov. 12, 1999

(30) Foreign Application Priority Data

Nov. 19, 1998 (DE) .......................... 198 53 422

(51) Int. Cl.$^7$ .................. B01D 50/00; B01D 53/34; E04B 1/74; C03C 3/076; C04B 35/00
(52) U.S. Cl. .................. 422/179; 422/177; 422/180; 252/62; 252/62.3 Q; 252/62.3 BT; 252/62.3 C; 501/55; 501/94; 501/95.1
(58) Field of Search ................ 422/177, 180, 422/179; 252/62, 62.3 Q, 62.3 BT, 62.3 C; 501/55, 94, 95.1; 428/137, 311.51, 312.6

(56) References Cited

U.S. PATENT DOCUMENTS

| 4,985,163 A | | 1/1991 | Kratel et al. |
| 5,242,871 A | * | 9/1993 | Hashimoto et al. ........... 501/95 |
| 5,556,689 A | | 9/1996 | Kratel et al. |
| 5,685,932 A | | 11/1997 | Stohr et al. |
| 5,911,903 A | | 6/1999 | Eyhorn et al. |

FOREIGN PATENT DOCUMENTS

| DE | 30 49 871 A1 | 3/1983 |
| DE | 196 08 302 A1 | 9/1996 |
| DE | 196 18 968 A1 | 11/1997 |
| EP | 0 256 416 A1 | 2/1988 |
| EP | 0 623 567 A1 | 5/1994 |
| EP | 0 643 204 A2 | 3/1995 |
| EP | 0 803 643 A1 | 10/1997 |
| FR | 2 102 491 | 4/1972 |

OTHER PUBLICATIONS

English Derwent Abstract [AN 1971 11919S [06]] Corresponding To FR 2 102 491.
English Derwent Abstract [AN 1988 051240 [08]] Corresponding To EP 0 256 416.
English Derwent Abstract corresponding to DE 19608302 (AN 1996–426280 (43)).
English Derwent Abstract corresponding to EP 0803643 (AN 1997–515367 (48)).
English Derwent Abstract corresponding to DE 3049871 (AN 1981–80061D (44)).

* cited by examiner

Primary Examiner—Glenn Caldarola
Assistant Examiner—Douglas W. Rudnick
(74) Attorney, Agent, or Firm—Brooks & Kushman P.C.

(57) ABSTRACT

An immobilizing structure for use in immobilizing a ceramic monolith in a catalytic converter employs a molding which comprises finely divided metal oxide and fibers which do not represent a health risk, has a density of 100–240 kg/m$^3$, and has a compression to at least 96% of its original thickness at a pressure of 1 bar applied for a period of 5 minutes, and exhibits a recovery of this compression to more than 70% of its initial value within about one minute after removal of the pressure.

16 Claims, No Drawings

MOLDING FOR SUPPORTING A MONOLITH IN A CATALYTIC CONVERTER

TECHNICAL FIELD

The invention relates to a molding for supporting a monolith in a catalytic converter, and to the production and use thereof.

BACKGROUND ART

A catalytic converter, required to be installed, for example, in motor vehicles, consists of a ceramic monolith carrying a catalytically active component on its porous surface, a catalytic converter casing, and a molding which supports and immobilizes the monolith in the casing in a gentle manner.

The moldings used for supporting and immobilizing ceramic monoliths in catalytic converter casings in this gentle manner are usually "swell mats". These consist of about 55% by weight of unexpanded vermiculite, 35% by weight of ceramic fibers and 10% by weight of binders. The job of the swell mat two fold: first, is to enclose the monolith in such a way that the latter is held immobilized during accelerations; and second, during operation, to compensate for the gap between the monolith and the converter casing, which ordinarily increases after startup owing to the thermal expansion of the outer skin. These objects have been achieved, first, with the aid of very high closing forces during assembly of the catalytic converter, i.e. during sealing of the converter casing, and second, by the presence of unexpanded vermiculite in the swell mat. The vermiculite expands at a temperature of about 400° C. and thus causes an increase in volume of the swell mat, which, in the normal case under the inclusion conditions, ensures adequate immobilization and sealing of the monolith. In swell mats, the increase in the volume of the expanded/swollen parts thus compensates for the different dimensions of the gap between the monolith and the converter casing.

A disadvantage of prior art swell mats is the high closing force during assembly of the catalytic converter, which can easily result in damage to the filigree ceramic monolith and thus irreversibly damage the catalytic converter. In addition, conventional swell mats are regarded as a health risk owing to their content of ceramic fibers. There is thus a demand for a ceramic-fiber-free molding for supporting and immobilizing monoliths in a catalytic converter casing. A known molding which satisfies this condition consists of knitted metal fabrics, but these require a two-layer internal structure. For economic and technical reasons, such moldings are therefore rarely used.

The ever more compact design of vehicles and the increasing exhaust temperatures require swell mats which are distinguished by good thermal insulation and thus make secondary or additional thermal-insulation measures, such as heat shields, either unnecessary or operate to reduce these requirements.

DISCLOSURE OF INVENTION

The object of the invention is to provide a microporous molding for supporting and immobilizing monoliths in catalytic converter casings which does not have the above disadvantages of swell mats, has good thermal insulation properties and in addition is simple and inexpensive to produce.

BEST MODE FOR CARRYING OUT THE INVENTION

The present invention relates to a microporous molding which comprises

60–95% by weight of finely divided metal oxide, 0.5–10% by weight of fibers which do not represent a health risk, 0–35% by weight of opacifiers, 0–10% by weight of organic fibers, and 0–30% by weight of refractory material which expands at a temperature above 300° C., and has a density of 100–240 kg/m$^3$, without taking into account the refractory material, and has a compression to 96% of its original thickness or less (thinner), measured during compression or immediately after compression by a pressure of 1 bar applied for a period of 5 minutes, wherein this compression has recovered to more than 70% of its initial value one minute after removal of the pressure. The molding according to the invention preferably exhibits a compression to at least 93% of its original thickness immediately after removal of a pressure of 1 bar applied for a period of 5 minutes. The compression has preferably recovered to more than 80% of its initial value 1 minute after removal of the pressure. In other words, the moldings of the present invention display both a high compressibility as well as a rapid recovery of thickness following compression.

Microporous moldings are usually not designed for elasticity. To the contrary, pressure-resistant sheets are generally desired, which is why such moldings may pass through a hardening step during production. Known microporous moldings are therefore not suitable for supporting and immobilizing a monolith in a catalytic converter casing, since the elasticity of this molding is too low to immobilize the monolith.

Only the molding according to the invention has a sufficiently high elasticity to immobilize the monolith in the converter casing in the long term and at the high temperatures which prevail in the catalytic converter under operating conditions. The elasticity is furthermore advantageous for immobilizing the monolith because the highly effective thermal insulation of the inventive moldings minimize thermal expansion of the converter casing in the hot state. Only a slight increase in the gap between the converter casing and the monolith therefore occurs. Both the elasticity and the thermal insulation of the molding according to the invention thus have an advantageous effect in immobilizing the monolith. Unlike the prior art, therefore, a molding for supporting monoliths according to the invention can be produced even without swellable substances.

The molding according to the invention offers the following advantages over known moldings for supporting monoliths in catalytic converters:

adequate elasticity, even in operation, for sufficient immobilizing the monolith;

free from ceramic fibers and other harmful substances;

installability to insulation/sheet with lower pressures/forces than hitherto, additionally allowing the use of longer monoliths, since the risk of fracture is considerably reduced;

maximum thermal insulation, reducing the external temperature of the catalytic converter, making additional secondary heat-protection measures unnecessary;

good installation behavior during assembly; and low weight.

The finely divided metal oxide is preferably selected from the group consisting of pyrogenic silicas, arc silicas, low-alkali precipitated silicas, silicon dioxide aerogels, aluminum oxides of analogous preparation, and mixtures thereof.

The finely divided metal oxide is more preferably selected from the group consisting of pyrogenic silica, aluminum oxide and mixtures thereof. The finely divided metal oxide preferably has a specific BET surface area of from 50 to 700 m$^2$/g, in particular from 70 to 400 m$^2$/g.

The molding according to the invention may additionally comprise components selected from the group consisting of opacifiers, inorganic fibers, organic fibers, and refractory materials which expand at temperatures above 300° C.

The molding according to the invention preferably comprises the following components:

70–90% by weight of finely divided metal oxide,

1–5% by weight of fibers which do not represent a health risk,

5–25% by weight of opacifiers,

0–5% by weight of organic fibers, and

0–25% by weight of refractory material which expands at a temperature above 300° C.

The molding according to the invention most preferably is limited to substantially the foregoing components.

The opacifier is preferably selected from the group consisting of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof. Owing to its low density and its absorption behavior in the infra-red region, silicon carbide is particularly preferred as an opacifier. The opacifier preferably has a particle size in the range from 0.1 to 10 μm.

The fibers which do not represent a health risk are preferably inorganic fibers without respirable components or fibers which do not represent a health risk owing to their chemical composition. Examples of inorganic fibers without respirable components are textile glass fibers or quartz fibers, which are preferred. The latter fibers are preferably selected from the group consisting of high-temperature-resistant fibers having an SiO$_2$ content of >60% by weight, preferably >90% by weight, textile fibers made from R glass, textile fibers made from S2 glass, textile fibers made from ECR glass, and fibers made from aluminum silicate. The fiber diameter is preferably >3 μm. Silica fibers are one example of high-temperature-resistant fibers having an SiO$_2$ content of >90% by weight.

The optional organic fibers serve to increase the green strength of the molding. Organic fibers are preferably selected from the group consisting of plastic fibers in general, natural fibers in general, viscose fibers, cotton fibers, cellulose, graphite and carbon fibers.

An example of a refractory material which expands at a temperature above 300° C. is unexpanded vermiculite.

The molding according to the invention is preferably sheet-shaped.

A sheet without refractory material generally has a density of 100–240 kg/m$^3$, preferably from 130 to 230 kg/m$^3$ in the initial state, and preferably has a density of 120–300 kg/m$^3$ in the installed state. For better handling, the sheet can be welded in foil or provided on one or both sides with organic or inorganic fabrics, papers, or foils. The low density of the material according to the invention gives the sheet an elasticity which is high for microporous materials.

The invention also relates to a process for the production of the molding according to the invention. In order to produce the molding, the individual components are mixed intensively, and the resultant mixture is molded under pressure in a manner known for microporous materials.

The invention furthermore relates to a process for immobilizing a monolith in a catalytic converter casing, which comprises wrapping a molding according to the invention around the monolith, placing the monolith wrapped in this way in the catalytic converter casing, and subsequently sealing the casing.

Another process for immobilizing a monolith in a catalytic converter casing comprises placing a molding according to the invention in the catalytic converter casing in such a way that, after the monolith has been laid in the catalytic converter casing, a wrapping made from the molding according to the invention and closed on all sides is formed around the monolith when the converter casing is closed.

Sealing the converter casing needs only little force when the material according to the invention is used. This is advantageous in view of the susceptibility of the ceramic monolith to fracture. The friction between the molding produced according to the invention and the monolith is so great that the holding forces necessary for immobilization act on the monolith even in the hot state. In addition, the extremely efficient thermal insulation of the material according to the invention reduces strong warming and resultant expansion of the converter casing.

The invention furthermore relates to a catalytic converter comprising a monolith, a means for immobilizing the monolith, and a casing, wherein the means for immobilizing the monolith is a molding according to the invention. The invention furthermore relates to the use of a molding according to the invention for immobilizing a monolith in a catalytic converter casing.

The examples below serve to illustrate the invention in greater detail:

EXAMPLE 1

78% by weight of highly disperse silica (BET 280 m$^2$/g), commercially available under the name HDK N25 from Wacker Chemie, Munich, 12% by weight of SiC (fineness<15 μm), commercially available under the name Silcar® P8 from ESK, Munich, 3% by weight of textile glass fibers (silicon content>92%), commercially available under the name Asglasil from Asglawo, Freiberg, and 7% by weight of an unexpanded vermiculite of grain size 1, commercially available under the name Vermiculit roh from Kramer Progetha, Düsseldorf, were dry-mixed intensively for 5 minutes in a fluid mixer. The resultant mixture was pressed axially to give flat sheets measuring 0.5 m×1.0 m with a thickness of 7 mm and a density of 160 kg/m$^3$. The net shape required in each case was produced from this sheet by stamping, sawing, cutting or other means.

In order to measure the elastic behavior of the moldings of the Examples and Comparative Example, a force-controlled press with travel-measuring device was used. The sheet thickness was measured. The surface pressure was applied to the sheet via the force regulation, and the compression was determined after 5 minutes with the aid of the measuring device. After a load time of 5 minutes, the pressure was removed from the sheet, and the sheet thickness was determined again after a further minute.

During this operation, the sheet was compressed by 1.05 mm (corresponding to 85% of its original thickness). After removal of the pressure, it expanded to a thickness of 6.85 mm, corresponding to 86% of the compression. This elasticity is sufficient for support of the monolith in the catalytic converter casing.

EXAMPLE 2

A sheet measuring 300 mm×300 mm×7 mm, produced as described in Example 1, consisting of (figures in % by weight) 78% of HDK N25, 19% of SiC (fineness less than 15 μm), 3% of textile glass fibers (silicon content>92%) having a density of 160 kg/m³ was subjected to a surface pressure of 1.3 bar. During this operation, the sheet was compressed by 0.84 mm (corresponding to 88% of its original thickness). After removal of the pressure, it expanded to a thickness of 6.90 mm, corresponding to 88% of the compression. This elasticity is sufficient for support of the monolith in the catalytic converter casing.

EXAMPLE 3

A sheet measuring 300 mm×300 mm×7 mm, produced analogously to Example 1, consisting of (figures in % by weight) 85% of HDK (BET 250 m²/g), 11% of SiC (Silcar P8), 2% of R-glass textile glass fibers (Vetrotex, Aachen), 2% of cellulose fibers (Arbocell FIF400), having a density of 220 kg/m³, was subjected to a surface pressure of 1.0 bar. During this operation, the sheet was compressed by 0.42 mm to 94% of its original thickness. After removal of the pressure, it expanded to a thickness of 6.93 mm (corresponding to 83% of the compression). This elasticity is sufficient for support of the monolith in the catalytic converter casing.

COMPARATIVE EXAMPLE 1

A standard sheet, commercially available under the name Wacker WDS® 1000 from Wacker Chemie GmbH (Munich), consisting of (figures in % by weight) 55% of HDK N25 (BET 280 m²/g), 40% of zirconium silicate, 5% of textile glass fibers (silicon content>92%) having a density of 320 kg/m³ and a thickness of 10.0 mm, was subjected to a surface pressure of 1.3 bar.

During this operation, the sheet was compressed to only 96.7% of its original thickness. After removal of the pressure, it expanded to a thickness of 9.8 mm, corresponding to only 40% of the compression. This elasticity is not sufficient for support of the monolith in the catalytic converter casing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A catalytic converter comprising a monolith, a structure for immobilizing the monolith, and a casing, wherein the structure for immobilizing the monolith is a microporous molding wherein said microporous molding comprises
   60–95% by weight of finely divided metal oxide,
   0.5–10% by weight of inorganic fibers which do not represent a health risk,
   0–35% by weight of opacifiers,
   0–10% by weight of organic fibers, and
   0–30% by weight of refractory material which expands at a temperature above 300° C.,
said microporous molding which, prior to installation in said catalytic converter has a density of 100–240 kg/m³, without taking into account the refractory material, and has a compression to at least 96% of its original thickness when subjected to a pressure of 1 bar for a period of 5 minutes, and wherein after said compression recovers to more than 70% of its initial value by one minute after removal of compressing pressure.

2. The catalytic converter of claim 1, wherein said microporous molding comprises
   70–90% by weight of finely divided metal oxide,
   1–5% by weight of fibers which do not represent a health risk,
   5–25% by weight of opacifiers,
   0–5% by weight of organic fibers and
   0–25% by weight of refractory material which expands at a temperature above 300° C.

3. The catalytic converter of claim 2, wherein the finely divided metal oxide is selected from the group consisting of pyrogenic silicas, arc silicas, low-alkali precipitated silicas, silicon dioxide aerogels, aluminum oxides, and mixtures thereof.

4. The catalytic converter of claim 3, wherein the fibers which do not represent a health risk are selected from the group consisting of high-temperature-resistant fibers having an SiO₂ content of >60% by weight, textile fibers made from R glass, textile fibers made from S2 glass, textile fibers made from ECR glass, fibers made from aluminum silicate, and mixtures thereof.

5. The catalytic converter of claim 3, wherein the organic fibers are selected from the group consisting of plastic fibers, natural fibers, viscose fibers, cotton fibers, cellulose, graphite, and carbon fibers, and mixtures thereof.

6. The catalytic converter of claim 2, wherein the opacifier is selected from the group consisting of ilmenite, titanium dioxide, iron(II)/iron(III) mixed oxides chromium dioxide, zirconium oxide, manganese dioxide, iron oxide, rutile, zirconium silicate, silicon carbide, and mixtures thereof.

7. The catalytic converter of claim 2, wherein the fibers which do not represent a health risk are selected from the group consisting of high-temperature-resistant fibers having an SiO₂ content of >60% by weight, textile fibers made from R glass, textile fibers made from S2 glass, textile fibers made from ECR glass, fibers made from aluminum silicate, and mixtures thereof.

8. The catalytic converter of claim 2, wherein the organic fibers are selected from the group consisting of plastic fibers, natural fibers, viscose fibers, cotton fibers, cellulose, graphite, and carbon fibers, and mixtures thereof.

9. The catalytic converter of claim 1, wherein the finely divided. metal oxide is selected from the group consisting of pyrogenic silicas, arc silicas, low-alkali precipitated silicas, silicon dioxide aerogels, aluminum oxides analogously prepared, and mixtures thereof.

10. The catalytic converter of claim 9, wherein the opacifier is selected from the group consisting of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof.

11. The catalytic converter of claim 9, wherein the fibers which do not represent a health risk are selected from the group consisting of high-temperature-resistant fibers having an SiO₂ content of >60% by weight, textile fibers made from R glass, textile fibers made from S2 glass, textile fibers made from ECR glass, fibers made from aluminum silicate, and mixtures thereof.

12. The catalytic converter of claim 9, wherein the organic fibers are selected from the group consisting of plastic fibers, natural fibers, viscose fibers, cotton fibers, cellulose, graphite, and carbon fibers, and mixtures thereof.

13. The catalytic converter of claim 1, wherein the opacifier is selected from the group consisting of ilmenite, titanium dioxide, iron(II)/iron(III) mixed oxides chromium dioxide, zirconium oxide, manganese dioxide, iron oxide, rutile, zirconium silicate, silicon carbide, and mixtures thereof.

14. The catalytic converter of claim 1, wherein the opacifier is silicon carbide.

15. The catalytic converter of claim 1, wherein the fibers which do not represent a health risk are selected from the group consisting of high-temperature-resistant fibers having an $SiO_2$ content of >60% by weight, textile fibers made from R glass, textile fibers made from S2 glass, textile fibers made from ECR glass, fibers made from aluminum silicate, and mixtures thereof.

16. The catalytic converter of claim 1, wherein the organic fibers are selected from the group consisting of plastic fibers, natural fibers, viscose fibers, cotton fibers, cellulose graphite, and carbon fibers, and mixtures thereof.

* * * * *